United States Patent [19]

Newland et al.

[11] Patent Number: 4,533,729

[45] Date of Patent: Aug. 6, 1985

[54] PROCESS FOR THE PREPARATION OF POLYCARBONATE POLYOLS

[75] Inventors: Gordon C. Newland, Kingsport, Tenn.; William R. Darnell, Weber City, Va.

[73] Assignee: Eastman Kodak Company, Rochester, N.Y.

[21] Appl. No.: 551,396

[22] Filed: Nov. 14, 1983

[51] Int. Cl.$^3$ .............................................. C08G 63/62
[52] U.S. Cl. .................................... 528/371; 260/463; 528/372
[58] Field of Search ....................... 528/370, 371, 372; 260/463

[56] References Cited

U.S. PATENT DOCUMENTS

| | | | |
|---|---|---|---|
| 3,379,693 | 4/1968 | Hostettler et al. | 525/440 |
| 4,105,641 | 8/1978 | Buysch et al. | 528/371 |
| 4,131,731 | 12/1978 | Lai et al. | 528/370 |
| 4,365,055 | 12/1982 | Madigan | 528/372 |

Primary Examiner—Maurice J. Welsh

Attorney, Agent, or Firm—Clyde L. Tootle; David E. Cotey; Daniel B. Reece, III

[57] ABSTRACT

The present invention provides a novel process for preparing specified amorphous polycarbonate polyols. The process comprises reacting phosgene, a branched-chain polyhydric alcohol, and a straight chain polyhydric alcohol in the presence of a solvent and in the absence of a catalyst at a temperature of about 60° to 100° C., and then contacting the amorphous polycarbonate product in the reaction mixture with a catalytic amount of a tertiary amine at reflux temperature for a period of time of at least about 30 minutes. The straight chain polyhydric alcohol is employed in an amount of about 3 to 40 mole percent, based upon the total amount of polyhydric alcohol present in the reaction system. A preferred branched-chain polyhydric alcohol is neopentyl glycol, and a preferred straight chain polyhydric alcohol is 1,6-hexanediol. Preferred solvents are xylene and toluene, and preferred tertiary amines are triethylamine and pyridine.

20 Claims, No Drawings

PROCESS FOR THE PREPARATION OF POLYCARBONATE POLYOLS

BACKGROUND OF THE INVENTION

The present invention relates to a process for the preparation of amorphous polycarbonate polyols.

Various processes for the preparation of polycarbonate polyols are known in the art. For example, U.S. Pat. No. 3,379,693 discloses a process for producing carbonate compositions which comprises heating at least one cyclic carbonate with at least one organic functional initiator (e.g., an alkylene diol) to a temperature in the range of about 50° to 225° C. The reaction is essentially a homopolymerization of the cyclic carbonate. The function of the diol or other initiator is to open the ring of the cyclic carbonate so as to provide active sites with which other cyclic carbonate molecules are capable of reacting. It is apparent that as the concentration of initiator in the reaction system is increased, the number of initiated polymer chains also increases, thereby reducing the molecular weight for a given amount of cyclic carbonate. Therefore, for a given level of diol initiator, the molecular weight of the product is fixed within a narrow range. There is therefore very little flexibility for varying both molecular weight and the amount of alkylene diol which can be incorporated into the polymer.

Other known processes involve the transesterification of aliphatic dihydroxy compounds with glycol carbonates, as illustrated by the processes disclosed in U.S. Pat. Nos. 4,105,641, 4,131,731, etc. Such transesterification reactions require the removal of by-product glycol. In contrast, the process of the present invention involves a simple esterification technique.

U.S. Pat. No. 4,365,055 discloses the preparation of a substantially linear carbonate polymer wherein carbonic dihalide is introduced to a substantially anhydrous solution comprising at least one substituted or unsubstituted 1,3-propanediol, the reaction being conducted in the presence of a nitrogen-containing organic catalyst, such as pyridine. While it is stated that the coproduction of cyclic carbonate is reduced by the presence of the catalyst during the reaction, the amount of cyclic carbonate produced is still undesirably high. In contrast, the process of the present invention can be employed to produce a specified class of polycarbonate polyols with the coproduction of only minimal amounts of cyclic carbonate.

SUMMARY OF THE INVENTION

The present invention provides a process for preparing amorphous polycarbonate polyols. The process comprises the steps of:

(A) reacting (i) phosgene, (ii) a branched-chain polyhydric alcohol having about 4 to 12 carbon atoms, and (iii) about 3 to 40 mole percent, based upon the total amount of polyhydric alcohol, of a straight-chain polyhydric alcohol having about 5 to 20 carbon atoms in the presence of a solvent and in the absence of a catalyst at a temperature of about 60° to 100° C., and (B) contacting the amorphous polycarbonate product in the reaction mixture with a catalytic amount of a tertiary amine at reflux temperature for a period of time of at least about 30 minutes.

DETAILED DESCRIPTION OF THE INVENTION

The present invention provides a novel process for preparing a specified class of amorphous polycarbonate polyols. The polycarbonate polyols are produced without the coproduction of significant amounts of undesirable cyclic carbonates. Furthermore, the process of the present invention provides for the substantially complete reaction of all end groups to hydroxyl groups to the virtual exclusion of undesirable end groups, such as chloroformate groups.

The amorphous polycarbonate polyols which are produced by the process of the present invention can be described as consisting essentially of moieties I, II, and III wherein

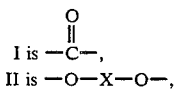

II is —O—X—O—, wherein X represents the residue of a branched-chain polyhydric alcohol having about 4 to 12 carbon atoms, and

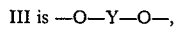

wherein Y represents the residue of a straight chain polyhydric alcohol having about 5 to 20 carbon atoms, and wherein moiety III is present in an amount of about 3 to 40 mole percent, based upon the total of moieties II and III. Of course, moiety I will be present in an amount substantially equal to the total of moieties II and III. These amorphous polycarbonate polyols have a molecular weight of about 300 to 3,000. These materials are useful in the preparation of polyurethane and melamine coating compositions.

In accordance with the process of the present invention, the amorphous polycarbonate polyols described above are prepared by reacting phosgene with a polyhydric alcohol component. The term "polyhydric alcohol" as used herein denotes a compound having two or more hydroxyl groups. Diols are preferred for use as the polyhydric alcohols.

The polyhydric alcohol component comprises (i) a branched-chain polyhydric alcohol having about 4 to 12 carbon atoms, and (ii) about 3 to 40 mole percent, based upon the total amount of polyhydric alcohol, of a straight chain polyhydric alcohol having about 5 to 20 carbon atoms.

Examples of suitable branched-chain polyhydric alcohols include pentaerythritol, the methyl-substituted propanediols, the ethyl-substituted propanediols, the methyl-, ethyl-, and propyl-substituted butanediols, the methyl-, dimethyl-, trimethyl-, ethyl-, diethyl-, triethyl-, propyl-, and dipropyl-substituted hexanediols, etc. Other examples of branched-chain polyhydric alcohols will be apparent to the person of ordinary skill in the art. Preferred branched-chain polyhydric alcohols include neopentyl glycol, pentaerythritol, and mixtures thereof. Neopentyl glycol is especially preferred for use as the branched-chain polyhydric alcohol.

The straight chain polyhydric alcohol can be any polyhydric alcohol having a straight carbon chain containing about 5 to 20 carbon atoms. The term "straight chain" as used herein is intended to denote hydrocarbyl chains, poly(alkylene glycol) chains, cycloaliphatic chains, and other such moieties which are free of substitution. Examples of such compounds include 1,5-pentanediol, 1,6-hexanediol, 1,7-heptanediol, 1,8-octanediol, 1,9-nonanediol, 1,10-decanediol, 1,12-dodecanediol, 1,13-tridecanediol, diethylene glycol, triethylene glycol, tetraethylene glycol, 1,4-cyclohexanedimethanol, 1,5-decalindiol, etc. Preferred straight chain polyhydric alcohols are 1,6-hexanediol, 1,8-octanediol, 1,10-decanediol, 1,12-dodecanediol, tetraethylene glycol, and mixtures thereof. Especially preferred as a straight chain diol is 1,6-hexanediol. The straight chain polyhydric alcohol is employed in an amount of about 3 to 40 mole percent, based upon the total amount of polyhydric alcohol present in the reaction system. Preferably, the straight chain polyhydric alcohol is employed in an amount of about 10 to 20 mole percent.

The polyhydric alcohol component is reacted with phosgene in a substantially anhydrous solution comprising an inert organic solvent. Virtually any solvent or mixture of solvents can be used as long as they are inert to the reactants and will dissolve the alcohols present in the reaction system. Examples of suitable solvents are aromatic hydrocarbon solvents, such as benzene, toluene, and xylene; chlorinated aromatic solvents, such as chlorobenzene, dichlorobenzene, and o-chlorotoluene; and chlorinated aliphatic solvents, such as methylene chloride, chloroform, carbon tetrachloride, trichloroethane, etc. Preferred inert solvents are toluene, xylene, benzene, chlorobenzene, methylene chloride, and mixtures thereof. Especially preferred are xylene, toluene, or a mixture thereof.

The amount of solvent employed in the reaction system should be sufficient to solvate the reactants in the product polymer at the reaction temperature. Usually, the weight ratio of inert solvent to dissolved solids will be in the range of about 0.5:1 to 100:1. A range of about 1:1 to 3:1 is preferred.

According to the process of the present invention, the polyhydric alcohols and phosgene are reacted in the presence of a solvent and in the absence of a catalyst. This reacting step is conducted at a temperature of about 60° to 100° C. Preferably, the temperature during the reacting step is about 80° to 90° C.

The reaction is generally conducted at ambient atmospheric pressure, although greater or lesser pressures may be used when desired. It may be advantageous in some instances to employ superatmospheric pressures in order to raise the boiling point of a low-boiling solvent.

The reacting step is conducted for a period of time which is sufficient for the substantial completion of the polymerization reaction. Typically, the reacting step will be conducted for a period of time of at least about 15 minutes. Preferably, the reacting step is conducted for a period of time in the range of about 0.5 to 5 hours.

While the reactants may be contacted during the reacting step in any known manner, it is typically desirable to prepare a mixture of the branched-chain polyhydric alcohol, the straight chain polyhydric alcohol, and the solvent in a heated reaction vessel. The phosgene, preferably in admixture with an inert gas such as nitrogen, can then be provided to the reaction vessel through a suitable inlet beneath the surface of the reaction mixture.

The phosgene and polyhydric alcohol component will be provided in approximately stoichiometric amounts. However, it typically is preferred to provide a slight excess of the polyhydric alcohol component. Thus, it is preferred for the molar ratio of total alcohol:phosgene present in the reaction system to be about 1.25:1 to 1:1. A molar ratio of alcohol:phosgene of about 1.1:1 is especially preferred.

When the polymerization reaction is substantially complete, the amorphous polycarbonate product which is present in the reaction mixture is then contacted with a catalytic amount of a tertiary amine. Suitable tertiary amines include triethylamine, pyridine, lower alkyl substituted derivatives of pyridine (such as 2,6-lutidine and 2,4,6-collidine), etc. Preferred tertiary amines are triethylamine, pyridine, and mixtures thereof. The tertiary amine is preferably employed in an amount of at least about 0.01 mole per mole of phosgene. In especially preferred embodiments, the tertiary amine is employed in an amount of about 0.01 to 0.2 mole per mole of phosgene (e.g., about 0.03 to 0.18 mole per mole of phosgene).

The contacting step is conducted at reflux temperature. Of course, the reflux temperature of the reaction system will vary depending upon the solvent employed. However, the reflux temperature of the reaction mixture typically will be about 100° to 150° C. (e.g., about 110° to 140° C.).

The contacting step is conducted for a period of time which is sufficient to convert substantially all of the terminal functional groups of the polymer to hydroxyl groups. Typically, the contacting step is conducted for a period of time of at least about 30 minutes. More preferably, the contacting step is conducted for a period of time of at least about 1 hour (e.g., about 1 to 5 hours).

Upon completion of the contacting step, the product can be recovered from the reaction mixture in any suitable manner. A preferred means of recovering the product involves cooling the reaction mixture to a temperature of about 80° C., washing the reaction mixture with water and then with dilute (e.g., about 5%) HCl, and then again with water. The organic layer can then be separated from the aqueous layer, and the solvent can be stripped from the organic layer. The product can then be recovered as a waxy solid.

The preparation of amorphous polycarbonate polyols by the process of the present invention can be accomplished either continuously or batchwise, but batchwise reactions are more usual.

The process of the present invention provides a means whereby a specified amorphous polycarbonate polyol can be prepared without at the same time coproducing undesirable cyclic carbonates. Furthermore, the present process provides as the terminal functional groups hydroxyl groups which are available for reaction in the preparation of polyurethanes, melamine resins, etc.

While not wishing to be bound by theoretical considerations, it appears that the present process avoids the formation of undesirable cyclic carbonates by performing the polymerization reaction in the absence of a catalyst. It has been observed that when a tertiary amine catalyst is employed throughout the course of the polymerization reaction, undesirably high quantities of cyclic carbonates are observed in the product. In contrast, in accordance with the present invention, the polymerization step is conducted in the absence of a catalyst, and unexpectedly small amounts of cyclic carbonates are observed in the product. Furthermore, the process of the present invention provides a product having reactive hydroxyl groups as the terminal functional groups. This is accomplished by contacting the amorphous polycarbonate product with a tertiary amine after polymerization has been substantially completed. The tertiary amine is believed to function so as to convert any remaining undesirable functional groups, such as chloroformate groups, to the desired hydroxyl end groups by reaction with excess alcohol. In this manner, a highly reactive polycarbonate polyol is obtained. These polyols demonstrate advantageous solubility characteristics and desirable UV and hydrolytic stability for use in the preparation of polyurethanes and melamine resins for coating applications.

This invention will be further illustrated by the following Examples although it will be understood that these Examples are included merely for purposes of illustration and are not intended to limit the scope of the invention.

EXAMPLE 1

Neopentyl glycol (0.9 mole) and 1,6-hexanediol (0.1 mole) were dissolved in 250 ml toluene by heating to 80° C. Phosgene (0.9 mole) was introduced into a nitrogen stream of 0.1 CFH at a rate of 0.005 mole/min. The gaseous stream was supplied under the surface of the liquid. The reactor was maintained at 80° C. and stirred vigorously. The effluent gas was passed through an alcohol-$CO_2$ condenser to a scrubber. After the addition of the specified amount of phosgene, the reaction mixture was stirred an additional 30 minutes. At the end of this stirring period, 22 ml triethylamine was introduced into the reaction mixture, the alcohol-$CO_2$ condenser was replaced with a water condenser, and the reaction mixture was refluxed for one hour. At the end of the reflux period, the solvent volume was reduced by one-half by distillation, and the residue was filtered to remove the solid triethylamine hydrochloride. The filtrate was washed with five percent HCl solution and water, the remaining solvent was stripped off, and the waxy solid product was recovered. Analysis of the product indicated a molecular weight of 550 and a hydroxyl number of 164. The product was soluble at 50% solids in a 1:1 mixture of butyl acetate:xylene, and contained 1.6% cyclic carbonate.

EXAMPLES 2-4

Examples 2-4 were conducted in a manner substantially similar to that of Example 1 except that pyridine was substituted for triethylamine. The results are summarized in Table I below. The amount of phosgene is given as mole percent phosgene, based upon the total number of moles of NPG and hexanediol employed.

TABLE I

| Ex. No. | Mol % NPG | Mol % Hexanediol | Phosgene | M.W. | Hydroxyl No. | Solubility | Cyclic Carbonate (%) |
|---|---|---|---|---|---|---|---|
| 2 | 93 | 7 | 89 | 665 | 142 | sol. | 2.0 |
| 3 | 93.7 | 6.3 | 97.0 | 892 | — | sol. | 9.3 |
| 4 | 95 | 5 | 90.5 | 634 | 164 | sol. | 1.9 |

EXAMPLES 5-6

Examples 5 and 6 were conducted in a manner substantially similar to that of Example 1 except that pyridine was substituted for triethylamine and xylene was employed as the solvent. The results are summarized in Table II below.

TABLE II

| Ex. No. | Mol % NPG | Mol % Hexanediol | Phosgene | M.W. | Hydroxyl No. | Solubility | Cyclic Carbonate (%) |
|---|---|---|---|---|---|---|---|
| 5 | 95 | 5 | 95 | 718 | 138 | sol. | 3.2 |
| 6 | 90 | 10 | 97 | 928 | 89 | sol. | 1.9 |

COMPARATIVE EXAMPLES 1-6

The indicated amounts of neopentyl glycol and 1,6-hexanediol were dissolved in 250 ml toluene by heating to 80° C. Dry pyridine was added to the reactor in an amount of 0.3 mole per mole of total alcohol employed. Phosgene was then introduced in the indicated amount into a nitrogen stream of 0.1 CFH at a rate of 0.005 mole per minute. The gaseous stream was applied under the surface of the liquid. The reactor was maintained at 80° C. and stirred vigorously. The effluent gas was passed through an alcohol-$CO_2$ condenser to a scrubber. After the addition of the specified amount of phosgene, the reactor was flushed with nitrogen, the alcohol-$CO_2$ condenser was replaced with a water condenser, and the reaction mixture was refluxed for one hour. At the end of the reflux period, the reaction mixture was cooled to about 80° C., was washed with 5% HCl and water, and the remaining solvent was stripped off. The waxy solid product was recovered. The results are given below in Table III.

TABLE III

| Comp. Ex. | Mol % NPG | Mol % Hexanediol | Phosgene | M.W. | Hydroxyl No. | Solubility | Cyclic Carbonate (%) |
|---|---|---|---|---|---|---|---|
| 1 | 93.75 | 6.25 | 92.6 | 778 | 114 | insol. | 9.8 |
| 2 | 93.75 | 6.25 | 95.4 | 935 | 77 | insol. | 9.9 |
| 3 | 93.75 | 6.25 | 94.0 | 803 | 93 | insol. | 12.0 |
| 4 | 90 | 10 | 97.5 | 925 | 126 | insol. | 33.0 |
| 5 | 90 | 10 | 96.8 | 888 | 69 | sol. | 39.6 |
| 6 | 85 | 15 | 94.7 | 1014 | 84 | insol. | 42.9 |

It is apparent that the results of Comparative Examples 1-6, which illustrate prior art processes which employ a catalytic polymerization system, are far inferior to the results provided by the process of the present invention. In particular, the prior art process gave undesirably high concentrations of cyclic carbonate by-product. In addition, all of the products obtained by the prior art process (except one) were insoluble in a typical solvent system.

Results similar to those of Table III were obtained with a xylene solvent.

The invention has been described in detail with particular reference to preferred embodiments thereof, but it will be understood that variations and modifications can be effected within the spirit and scope of the invention.

We claim:

1. A process for preparing amorphous polycarbonate polyols comprising the steps of:
    (A) reacting (i) phosgene, (ii) a branched-chain polyhydric alcohol having about 4 to 12 carbon atoms, and (iii) about 3 to 40 mole percent, based upon the total amount of polyhydric alcohol, of a straight chain polyhydric alcohol having about 5 to 20 carbon atoms in the presence of a solvent and in the absence of a catalyst at a temperature of about 60° to 100° C., and (B) contacting the amorphous polycarbonate product in the reaction mixture with a catalytic amount of a tertiary amine at reflux temperature for a period of time of at least about 30 minutes.

2. The process of claim 1 wherein said reacting step is conducted for a period of time of at least about 15 minutes.

3. The process of claim 1 wherein said polyhydric alcohols are diols.

4. The process of claim 1 wherein said branched-chain polyhydric alcohol comprises neopentyl glycol, pentaerythritol, or a mixture thereof.

5. The process of claim 3 wherein said straight chain diol comprises 1,6-hexanediol, 1,8-octanediol, 1,10-decanediol, 1,12-dodecanediol, tetraethylene glycol, or a mixture thereof.

6. The process of claim 1 wherein the molar ratio of total alcohol:phosgene present in the reaction system is about 1.25:1 to 1:1.

7. The process of claim 1 wherein said solvent comprises xylene, toluene, benzene, chlorobenzene, methylene chloride, or a mixture thereof.

8. The process of claim 1 wherein said solvent comprises xylene, toluene, or a mixture thereof.

9. The process of claim 1 wherein said reacting step is conducted at a temperature of about 80° to 90° C.

10. The process of claim 1 wherein said tertiary amine comprises triethylamine, pyridine, or a mixture thereof.

11. The process of claim 1 wherein said tertiary amine is employed in an amount of at least about 0.01 mole per mole of phosgene.

12. The process of claim 1 wherein said tertiary amine is employed in an amount of about 0.01 to 0.2 mole per mole of phosgene.

13. The process of claim 1 wherein said straight chain polyhydric alcohol is employed in an amount of about 10 to 20 mole percent, based upon the total amount of alcohol.

14. The process of claim 1 wherein said contacting step is conducted at a temperature of about 100° to 150° C.

15. A process for preparing amorphous polycarbonate polyols comprising the steps of:

(A) reacting for a period of time of at least about 15 minutes (i) phosgene, (ii) a branched-chain diol comprising neopentyl glycol, and (iii) about 10 to 20 mole percent, based upon the total amount of diol, of a straight chain diol comprising 1,6-hexanediol, 1,8-octanediol, 1,10-decanediol, 1,12-dodecanediol, tetraethylene glycol, or a mixture thereof in the absence of a catalyst and in the presence of a solvent comprising xylene toluene, or a mixture thereof at a temperature of about 80° to 90° C., wherein the molar ratio of total diol:phosgene present in the reaction mixture is about 1.25:1 to 1:1, and (B) contacting the amorphous polycarbonate product in the reaction mixture at a temperature of about 100° to 150° C. with about 0.01 to 0.2 mole of a tertiary amine per mole of phosgene for a period of time of at least about 30 minutes.

16. The process of claim 15 wherein said tertiary amine comprises triethylamine, pyridine, or a mixture thereof.

17. The process of claim 15 wherein said tertiary amine is employed in an amount of about 0.03 to 0.18 mole per mole of phosgene.

18. The process of claim 15 wherein said straight chain diol comprises 1,6-hexanediol.

19. The process of claim 15 wherein the molar ratio of total diol:phosgene is about 1.1:1.

20. An amorphous polycarbonate polyol made by the process of claim 1.

* * * * *